(12) United States Patent
Uesugi et al.

(10) Patent No.: US 6,834,997 B2
(45) Date of Patent: Dec. 28, 2004

(54) SPINDLE DEVICE USING DYNAMIC PRESSURE BEARING

(75) Inventors: Masakazu Uesugi, Yamanashi-ken (JP); Masahiro Tsunofuri, Yamanashi-ken (JP); Shotaro Mizobuchi, Yamanashi-ken (JP)

(73) Assignee: THK Co., Ltd., Tokyo (JP)

( * ) Notice: Subject to any disclaimer, the term of this patent is extended or adjusted under 35 U.S.C. 154(b) by 57 days.

(21) Appl. No.: 10/457,566

(22) Filed: Jun. 10, 2003

(65) Prior Publication Data

US 2004/0008913 A1 Jan. 15, 2004

(30) Foreign Application Priority Data

Jul. 9, 2002 (JP) ........................... 2002-200435

(51) Int. Cl.[7] ........................... F16C 32/06; F16C 37/00
(52) U.S. Cl. ........................... 384/100; 384/113; 384/317
(58) Field of Search ........................... 384/100, 107, 384/113, 114, 119, 120, 317, 318, 320

(56) References Cited

U.S. PATENT DOCUMENTS 4,514,099 A * 4/1985 John et al. ............... 384/100
5,063,322 A * 11/1991 Sugita et al. ............. 384/120

FOREIGN PATENT DOCUMENTS

| JP | 06-241222 | 8/1994 |
| JP | 06-249236 | 9/1994 |
| JP | 07-019236 | 1/1995 |
| JP | 2000-329140 | 11/2000 |

* cited by examiner

Primary Examiner—Thomas R. Hannon
(74) Attorney, Agent, or Firm—Rader, Fishman & Grauer PLLC

(57) ABSTRACT

Disclosed is a spindle device endowed with a sufficient load capacity for bending moment and capable of reducing power loss and heat generation of the main shaft attributable to the radial dynamic pressure bearing. In this spindle device, the rotation of the spindle rotor is supported by a pair of radial dynamic pressure bearing portions, between which there is provided a first cooling chamber so as to circumferentially surround the spindle rotor, atmosphere outside the housing being introduced into the first cooling chamber.

4 Claims, 3 Drawing Sheets

SPINDLE DEVICE USING DYNAMIC PRESSURE BEARING

FIELD OF THE INVENTION AND RELATED ART STATEMENT

The present invention relates to a spindle device adapted to generate a high pressure fluid lubrication film as the rotor rotates, supporting the rotation of the rotor by this fluid lubrication film and, in particular, to a spindle device using a liquid such as water, and coolant liquid as lubrication fluid for such a dynamic pressure bearing.

JP 6-241222 A, JP 6-249236 A, JP 7-19236 A, etc. disclose spindle devices in which the rotation of a main shaft is supported by a dynamic pressure bearing. Such spindle devices are equipped with a housing fixed to a main shaft head or the like of a machine tool, a main shaft connected to a driving unit for rotation, and a radial dynamic pressure bearing and a thrust dynamic pressure bearing each of which is constructed of a rotary side member and a stationary side member opposed to each other through the intermediation of a predetermined bearing gap and adapted to rotatably support the main shaft with respect to the housing, with a dynamic pressure generating groove with a depth of approximately 10 to 15 $\mu$m being formed in a predetermined pattern in the rotary side member of each dynamic pressure bearing.

In a spindle device constructed as described above, lubrication fluid existing in the bearing gaps of the dynamic bearings is pressurized as the main shaft rotates, and the main shaft is levitated by a high pressure fluid lubrication film, its rotation being supported in this state. Thus, only a slight rotational resistance is offered to the rotation of the main shaft, and substantially no vibration due to the rotation is generated, so that this spindle device is advantageously capable of being used with the main shaft being rotated at a high speed of 10,000 rpm or more.

In this spindle device, the lubrication fluid is pressurized as the main shaft rotates, so that, if the bearing gap between the rotary side member and the stationary side member of each dynamic pressure bearing is excessively large, it is impossible to sufficiently increase the pressure of the lubrication fluid in the bearing gap, resulting in deteriorations in the load capacity and rigidity of the main shaft with respect to external load. In view of this, in the above-described conventional spindle device, the bearing gap is set to approximately several $\mu$m, making it possible to sufficiently pressurize the lubrication fluid even during low speed rotation of the main shaft.

The lubrication fluid pressurized in the bearing gap of each dynamic pressure bearing may be a gas such as air or a liquid such as water and a coolant for machine tools. Since a gas is more compressible than a liquid, the load capacity and rigidity of the main shaft with respect to load are improved by using a liquid as the lubrication fluid instead of a gas.

In a spindle device for use in a machine tool or the like, a large load may be applied to the forward end of the main shaft from a radial direction perpendicular to the axial direction. In this case, a large bending moment is applied to the main shaft. And, to support the rotation of the main shaft against this bending moment, it is effective to make the bearing gap still smaller or make the radial dynamic pressure bearing long in the axial direction.

However, in either case, rotation of the main shaft causes a large shearing force to be applied to the lubrication fluid. Further, in the case in which a liquid (hereinafter referred to as "lubricant") that is inferior to a gas in compressibility is used as the lubrication fluid, the shearing force applied is still larger, and the load on the motor for rotating the main shaft increases. Further, the main shaft undergoes thermal expansion due to shearing frictional heat, resulting in a deterioration in the work machining precision of the machine tool. Further, the lubricant supplied to the dynamic pressure bearings attains high temperature, so that an attempt to recover the lubricant from the dynamic pressure bearings for re-supply could involve the danger of heating the main shaft.

To avoid such problems, it is necessary, for example, to provide a water jacket around each stationary side member to thereby directly cool the dynamic pressure bearings, or to cool the lubricant discharged from the bearing gaps outside the housing before supplying it again to the bearing gaps, with the result that the dynamic pressure bearings have to be rather complicated in structure and increased in size.

OBJECT AND SUMMARY OF INVENTION

The present invention has been made in view of the above problems in the prior art. It is an object of the present invention to provide a spindle device endowed with a sufficient load capacity for bending moment and capable of mitigating the power loss and the heating of the main shaft attributable to the radial dynamic pressure bearing.

In order to attain the above-mentioned object, a spindle device using a dynamic pressure bearing of the present invention is characterized by including: a housing; a spindle rotor one end portion of which protrudes from the housing; a pair of radial dynamic pressure bearing portions provided on the spindle rotor at a predetermined axial interval and rotatably supporting the spindle rotor with respect to the housing; a supply flow passage for guiding lubricant to bearing gaps of the radial dynamic pressure bearing portions; a first cooling chamber provided between the pair of radial dynamic pressure bearing portions so as to circumferentially surround the spindle rotor and communicating with the bearing gaps of the radial dynamic bearing portions; and an air inlet adapted to introduce atmosphere outside the housing into the first cooling chamber.

This technical measure, in which the pair of radial dynamic pressure bearing portions for supporting the rotation of the spindle motors is provided at predetermined axial intervals, provides sufficient rigidity with respect to any bending moment applied to the spindle rotor. Further, since the first cooling chamber surrounding the spindle rotor is formed between the pair of radial dynamic pressure bearing portions, no great shearing force is applied to the portion of the spindle rotor where this first cooling chamber is formed, making it possible to mitigate heat generation and power loss of the spindle rotor.

Further, since the bearing gap of each radial dynamic pressure bearing portion and the first cooling chamber communicate with each other, the lubricant supplied to the bearing gap of each radial dynamic pressure bearing portion and pressurized in the bearing gap is directly ejected into the first cooling chamber, into which atmosphere outside the housing is introduced through the inlet, with the result that the first cooling chamber is maintained at a pressure substantially equal to the atmospheric pressure. Thus, when the lubricant pressurized to a very high pressure in the bearing gap is ejected into the first cooling chamber, which is substantially at the equal pressure as the atmospheric pressure, and the lubricant is ejected as fine droplets in an atomized state, so that the interior of the first cooling chamber is cooled due to heat of vaporization, whereby the spindle rotor surrounded by the first cooling chamber can be positively cooled.

The lubricant ejected into the first cooling chamber is turned into droplets to be eventually discharged to the exterior of the housing. If the droplets adhering to the spindle rotor were allowed to rotate with the spindle rotor, that would result in an accordingly larger load on the rotation of the spindle motor, resulting in power loss. Thus, from this point of view, it is desirable to impart water repellency to the peripheral surface of the spindle rotor facing the first cooling chamber, thereby preventing lubricant from being rotated together with the spindle rotor.

Further, in an aspect where the spindle device of the present invention is actually employed, a thrust dynamic pressure bearing portions for regulating a movement in an axial direction of the spindle motor may be provided. From a viewpoint of miniaturization and satisfactory balance of the spindle device, it is preferable that the spindle device further includes a pair of thrust dynamic pressure bearing portions provided so as to axially sandwich the pair of radial dynamic pressure bearing portions to establish communication between bearing gaps of the thrust dynamic pressure bearing portions and the bearing gaps of the radial dynamic pressure bearing portions adjacent thereto. In this case, it is effective that each radial dynamic pressure bearing portion is equipped with dynamic pressure generating grooves for pressurizing lubricant toward the bearing gap of the thrust dynamic pressure bearing portion and pressurization discharge grooves for pressurizing the lubricant toward the above-mentioned first cooling chamber. With this arrangement, a part of the lubricant supplied to the radial dynamic pressure bearing portions can be reliably ejected into the first cooling chamber, making it possible to cool the spindle rotor. Further, it is also possible to prevent the atmosphere introduced into the first cooling chamber from outside the housing from flowing into the bearing gaps of the radial dynamic pressure bearings, thereby avoiding the danger of foreign matter entering the radial dynamic pressure bearing portions.

Furthermore, in order to prevent intrusion of dust into the housing from outside, it is desirable to provide a labyrinth seal portion between the spindle rotor and the housing, to thereby hermetically seal the atmosphere in the housing from the exterior thereof. In this case, when water repellency has been imparted to the labyrinth seal portion, it is possible to prevent coolant or the like from entering the housing through the labyrinth portion by capillary action even if coolant or the like is poured from outside onto the labyrinth seal portion, thus enhancing the sealing property for the housing.

DETAILED DESCRIPTION OF THE PREFERRED EMBODIMENT

A spindle device according to the present invention will now be described in detail with reference to the accompanying drawings.

Figure 1:
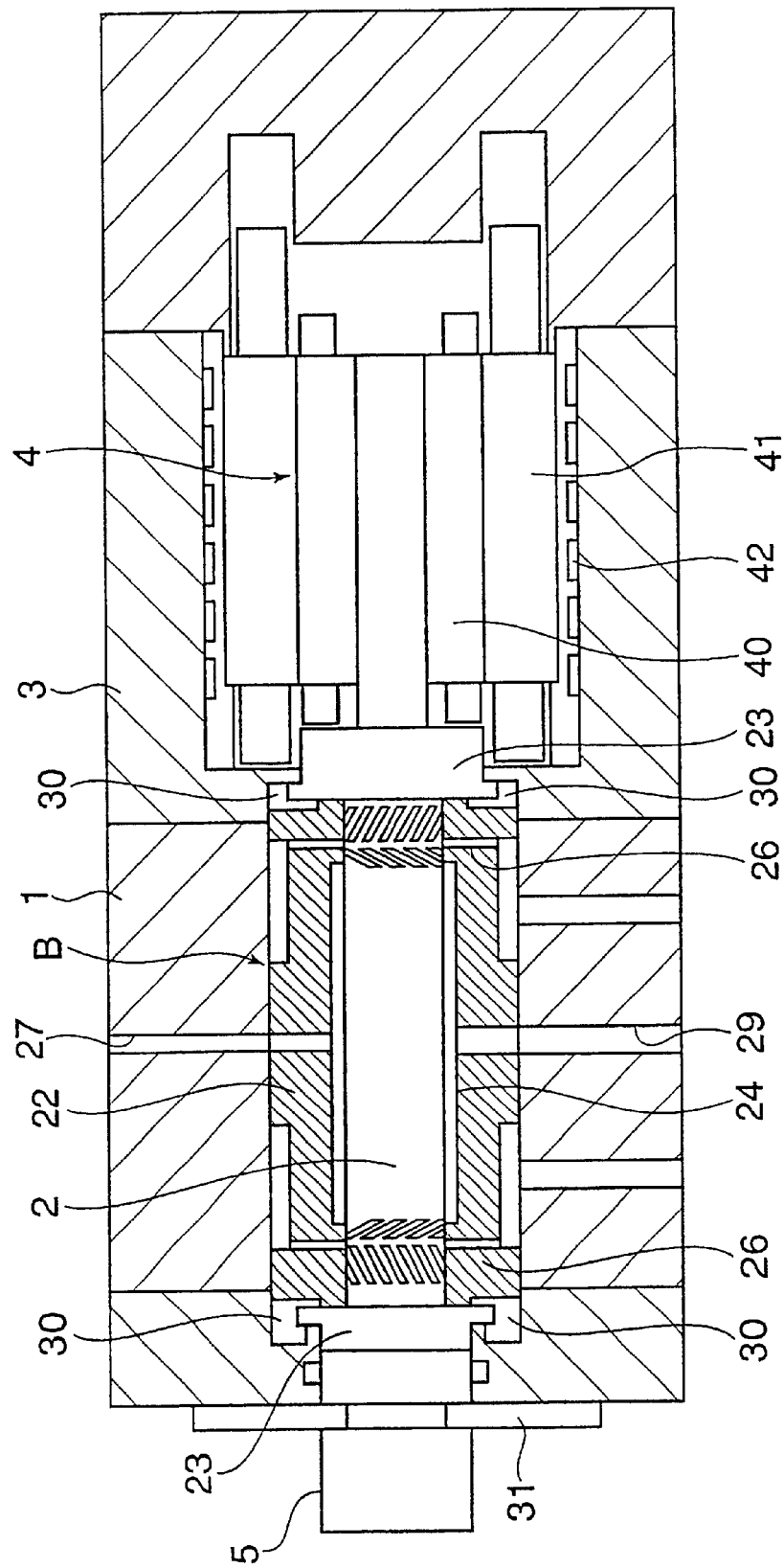
FIG. 1 is a schematic diagram showing a spindle device according to an embodiment of the present invention.

FIG. 1 shows a spindle device to be mounted, for example, to a spindle head of a machine tool. This spindle device is composed of a spindle main shaft 2 rotatably supported by a bearing housing 1 through the intermediation of a dynamic pressure bearing portion B and a motor 4 accommodated in a motor housing 3 fixed to the bearing housing 1 and adapted to rotate the spindle main shaft 2; a tool such as a grind stone can be mounted to the forward end of the spindle main shaft 2 through the intermediation of a quill portion 5.

The motor 4 for driving the spindle main shaft 2 is composed of a motor rotor 40 fixed onto the spindle main shaft 2 and a motor stator 41 fixed to the motor housing 3, and a motor drive signal is input to the motor stator 41 from outside through a connector (not shown) mounted to the motor housing 3. Further, to prevent as much as possible the spindle main shaft 2 from expanding due to heat generated in the motor 4 and flowing into the spindle main shaft 2, there is provided a water jacket 42 between the motor housing 3 and the motor stator 41.

Figure 2:
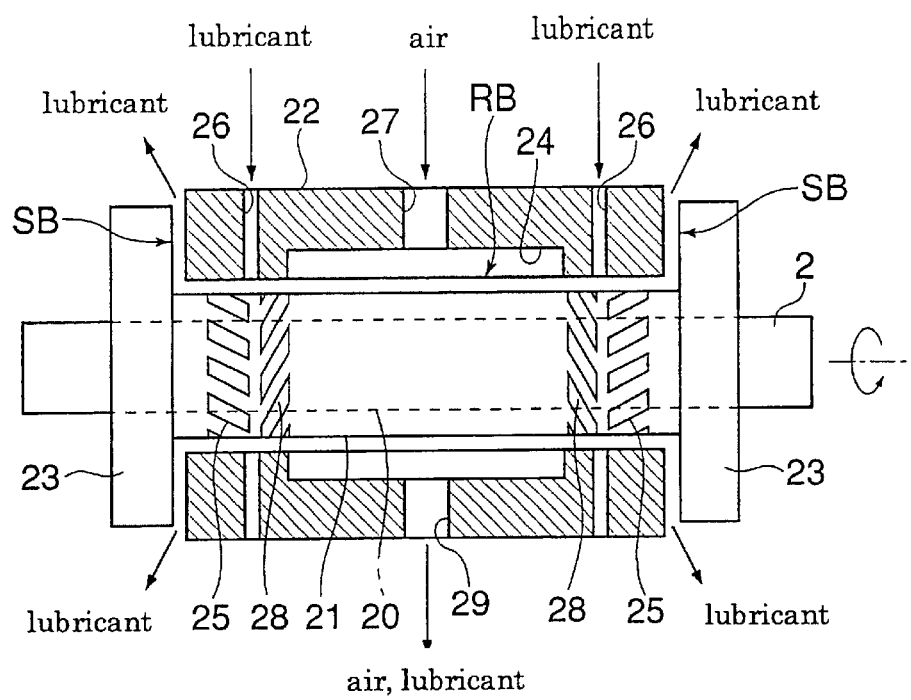
FIG. 2 is a schematic diagram showing the construction of the dynamic pressure bearing portion according to the embodiment of the invention.

FIG. 2 schematically shows the construction of the dynamic pressure bearing portion B. A radial dynamic pressure bearing portions RB supporting the rotation of the spindle main shaft 2 with respect to the bearing housing 1 is constructed of a sleeve 21 serving as a rotary side member fixed to a journal portion 20 of the spindle main shaft 2 and a bearing ring 22 serving as a stationary side member fitted with play onto the outer side of the sleeve 21 and fixed in position inside a hollow portion of the bearing housing 1, with a predetermined bearing gap (e.g., 5 to 15 µm) being formed between the outer peripheral surface of the sleeve 21 and the inner peripheral surface of the bearing ring 22. The sleeve 21 and the bearing ring 22 are formed of a ceramic material having a small thermal expansion coefficient. While in this example the sleeve 21 serving as the inner race of the radial dynamic pressure bearing is fitted onto the journal portion 20 of the spindle main shaft 2, it is also possible for the journal portion 20 to function as it is as the inner race, forming the radial dynamic pressure bearing with the sleeve 21 omitted.

A pair of thrust dynamic pressure bearing portions SB is provided so as to axially sandwich the radial dynamic pressure bearing portion RB, and axial movement of the spindle main shaft 2 is restricted by these thrust dynamic pressure bearing portions SB. The thrust dynamic pressure bearing portions SB are composed of a pair of thrust plates 23 serving as the rotary side members fixed to the spindle main shaft 2 so as to sandwich the sleeve 21 and the above-mentioned bearing ring 22, and predetermined bearing gaps communicating with the bearing gap of the radial dynamic pressure bearing portion RB are formed between the thrust plates 23 and the axial end surfaces of the bearing ring 22. Here, it is also possible for one of the thrust plates 23 to be formed integrally with the sleeve 21, which helps to reduce the time and effort for assembling the dynamic pressure bearing portion B.

Thus, as shown in FIG. 2, the spindle main shaft 2 is formed so as to rotate together with the sleeve 21 and the pair of thrust plates 23, and these components form an integral unit constituting the spindle rotor of the present invention.

Further, a first cooling chamber 24 in the form of a recess is formed in the inner peripheral surface of the bearing sleeve 22 so as to circumferentially surround the outer peripheral surface of the spindle rotor, that is, the outer peripheral surface of the sleeve 21. The radial depth of this first cooling chamber 24 is set to be approximately 0.02 to 0.2 times the inner diameter of the bearing sleeve 22. Thus, only the portions of the bearing sleeve 22 on either end of the first cooling chamber 24 are opposed to the sleeve 21 through the intermediation of the above-mentioned bearing gap, and the radial dynamic pressure bearing portion RB is divided into two by the first cooling chamber 24, forming a pair of radial dynamic pressure bearing portions axially spaced apart from each other by a predetermined distance.

Herringbone-like dynamic pressure generating grooves 25 are formed in the outer peripheral surface of the sleeve 21 opposed to the inner peripheral surface of the bearing ring 22 through the intermediation of the bearing gap. As the spindle main shaft 2, that is, the sleeve 21, rotates, these dynamic pressure generating grooves 25 pressurize lubrication fluid existing in the bearing gap, acting so as to force the lubrication fluid into the bearing gaps of the adjacent thrust dynamic pressure bearings. Further, formed in the bearing ring 22 are supply flow passages 26 radially extending therethrough and communicating with the bearing gap of the radial dynamic pressure bearing portion RB, and lubrication liquid such as water or oil serving as lubrication fluid is supplied to the bearing gap of the radial dynamic pressure bearing portion RB through the supply passages 26. Thus, when the spindle main shaft 2 rotates, lubricant is sucked into the bearing gap from the supply flow passages 26 due to the pressurizing action of the dynamic pressure generating grooves 25. Further, lubricant is pressurized in the bearing gap and a high pressure fluid lubrication film is formed therein, whereby the spindle rotor is supported in rotation in a non-contact state with respect to the bearing ring 22.

Figure 3:
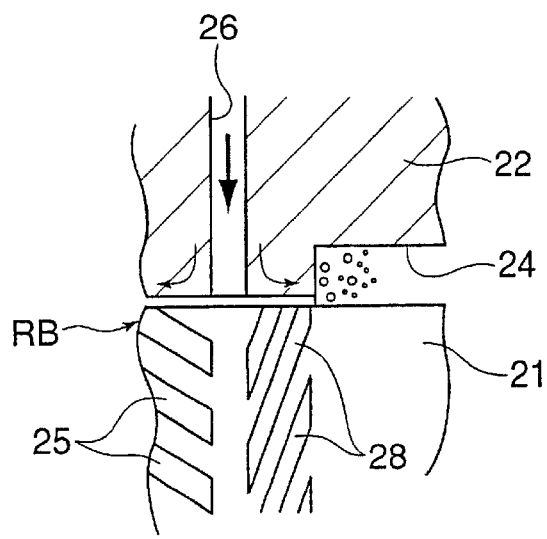
FIG. 3 is an enlarged view of an example of the construction of the radial dynamic pressure bearing portion according to the embodiment of the invention.

As shown in FIG. 3, a part of the lubricant pressurized in the bearing gap of the radial dynamic pressure bearing portion RB flows into the bearing gaps of the adjacent thrust dynamic pressure bearing portions SB, whereas the remainder of the lubricant is ejected into the adjacent first cooling chamber 24. Formed in the bearing ring 22 having the first cooling chamber 24 is an air inlet 27 extending radially therethrough, and this air inlet 27 introduces air outside the bearing housing 1 into the first cooling chamber 24. In the case of this arrangement, in which high pressure lubricant pressurized inside the bearing gap of the radial dynamic pressure bearing portion RB is ejected into the first cooling chamber 24 having a larger opening sectional area than that of the bearing gap, even if its depth is, for example, approximately 3 mm, the first cooling chamber 24 is approximately 200 times as large as the bearing gap of the radial dynamic pressure bearing portion RB, the bearing gap being ten and several $\mu$m. Further, the pressure of the lubricant generated in the bearing gap is as high as several tens of atmospheres, so that, when lubricant is ejected into the first cooling chamber 24, which is sufficiently larger than the bearing gap, it is as if the lubricant is sprayed into the atmosphere. As a result, heat of vaporization is taken from the lubricant when it is ejected into the first cooling chamber 24 from the radial dynamic pressure bearing portion RB, and it is possible to reduce the temperature of the lubricant, which has attained high temperature in the radial dynamic pressure bearing portion RB. Further, it is possible to lower the temperature of the sleeve 21 facing the first cooling chamber 24 and, by extension, the temperature of the spindle main shaft 2.

In particular, in this embodiment, in order to promote the ejection of lubricant into the first cooling chamber 24 from the bearing gap of the radial dynamic pressure bearing portion RB, there are provided pressurization discharge grooves 28 adjacent to the dynamic pressure generating grooves 25 and arranged on the first cooling chamber 24 side. The dynamic pressure generating grooves 25 pressurize the lubricant in the bearing gap toward the thrust dynamic pressure bearing portions SB, so that, when the RPM of the spindle main shaft 2 increases, and the pressurizing effect of the dynamic pressure generating grooves 25 is enhanced, most of the lubricant having flowed into the bearing gap from the supply passages 26 is allowed to be supplied to the thrust dynamic pressure bearing portions SB, with the result that no lubricant at all is ejected into the first cooling chamber 24. Moreover, the air in the first cooling chamber 24 is allowed to flow into the bearing gap of the radial dynamic pressure bearing portion RB, so that there is a fear of the load capacity of the radial dynamic pressure bearing portion RB being drastically reduced. It is to be noted, however, that, as the spindle main shaft 2 rotates, the pressurization discharge grooves 28 pressurize the lubricant existing in the bearing gap of the radial dynamic pressure bearing portion RB toward the first cooling chamber 24 to thereby prevent the air in the first cooling chamber 24 from being allowed to flow back into the bearing gap. That is, the pressurization discharge grooves 28 function as a seal for sealing the bearing gap of the radial dynamic pressure bearing portion RB from the first cooling chamber 24.

Figure 4:
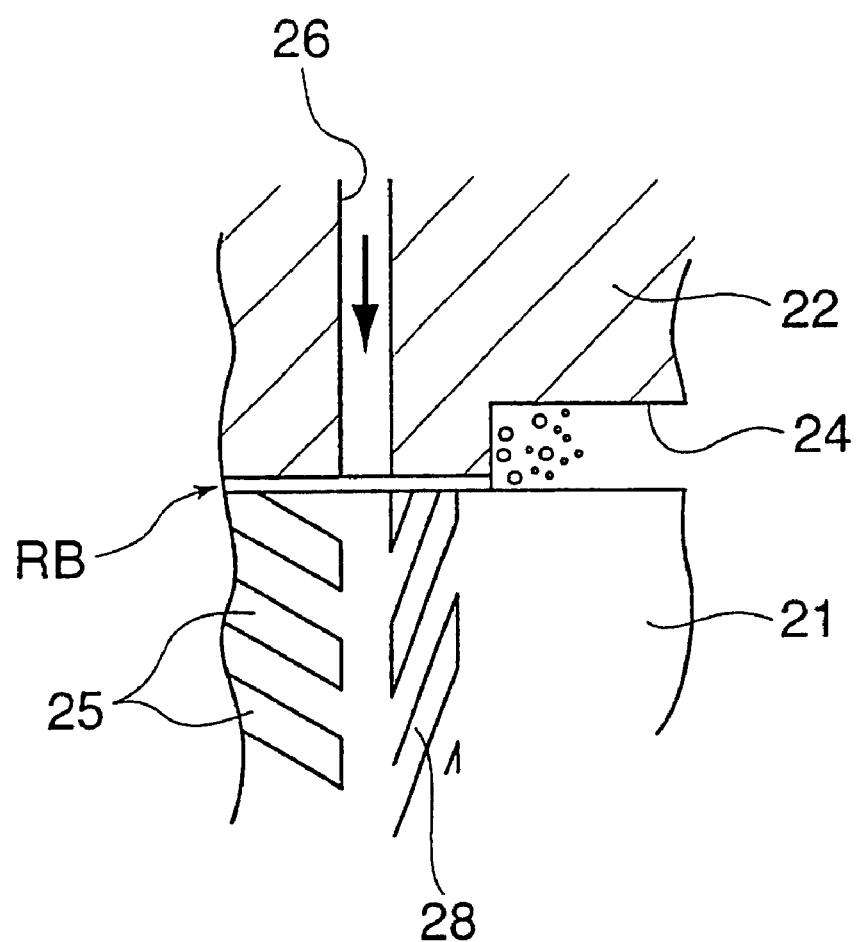
FIG. 4 is an enlarged view of another example of the construction of a radial dynamic pressure bearing portion according to the embodiment of the invention.

The pressurization discharge grooves 28 may be formed so as to cover the entire region between the first cooling chamber 24 and the supply flow passage 26 as shown in FIG. 3 or may be formed so as to exhibit a smaller axial length than the region between the first cooling chamber 24 and the supply flow passage 26 as shown in FIG. 4. In the former case, lubricant is directly discharged into the first cooling chamber 24 through the pressurization discharge grooves 28, and is scattered in the first cooling chamber 24 by the centrifugal force imparted thereto from the pressurization discharge grooves 28 at the time of discharge, thereby promoting vaporization. In the latter case, the pressure applied to the lubricant is maximum in the border portion between the pressurization discharge grooves 28 and the first cooling chamber 24, that is, in the portion of the bearing gap where no pressurization discharge grooves 28 are formed, so that it is possible to promote vaporization by discharging high pressure lubricant into the first cooling chamber 24 with a low pressure.

In this way, lubricant is ejected into the first cooling chamber 24 from the bearing gap of the radial dynamic pressure bearing portion, so that air introduced from outside the bearing housing 1 and the lubricant coexist in the first cooling chamber 24, and the lubricant and the air are discharged to the exterior of the bearing housing 1 through a discharge flow passage 29 formed so as to radially extend through the bearing ring 22. At this time, inside the first cooling chamber 24, droplets of lubricant rotate together with the rotating sleeve 21, which leads to rotational resistance for the spindle main shaft 2, so that from the viewpoint of mitigating the power loss of the motor 4 due to an increase in rotational resistance, it is desirable to endow the portion of the outer peripheral surface of the sleeve 21 facing the first cooling chamber 24 with water repellency. This could be effected by forming, for example, a nickel plating layer with high fluorine concentration or a water-repellent resin layer consisting of dichlorethylene or the like. By thus rendering the sleeve surface water repellent, it is possible to restrain lubricant from rotating inside the first cooling chamber 24 together with the spindle rotor, whereby it is possible to mitigate the power loss during the rotation of the spindle main shaft 2.

Further, spiral dynamic pressure generating grooves are formed in the surfaces of the thrust plates 23 facing the axial end surfaces of the bearing ring 22; when the spindle main shaft 2 rotates, the lubrication fluid existing in the bearing gaps between the bearing ring 22 and the thrust plates 23, that is, the lubrication fluid existing in the bearing gaps of the thrust dynamic pressure bearing portions SB, is pressurized by these dynamic pressure generating grooves, forming high pressure fluid lubrication films in these bearing gaps. As a result, the spindle main shaft 2 is restricted in its axial movement by the pair of thrust dynamic pressure bearings SB sandwiching the bearing ring 22.

The spiral dynamic pressure generating grooves formed in the thrust plates 23 are so-called pump-out type grooves, which, when the spindle main shaft 2 rotates, pressurize, with the rotation, the lubricant in the bearing gaps from the inner toward the outer peripheries of the thrust plates 23, and in which the lubricant having flowed in from the bearing gap of the radial dynamic pressure bearing portion is discharged from the outer peripheries of the thrust plates 23. Further, inside the bearing housing 1, there are provided second cooling chambers 30 so as to surround the outer peripheries of the thrust plates 23, and the lubricant pressurized inside the bearing gaps from the inner toward the outer peripheries of the thrust plates 23 in accordance with the rotation of the spindle main shaft 2, is eventually ejected into these second cooling chambers 30. As with the first cooling chamber 24, air outside the bearing housing 1 has been introduced into the second cooling chambers 30, and, when lubricant is ejected into the second cooling chambers 30, which are sufficiently larger than the bearing gaps of the thrust dynamic pressure bearing portions, it is as if the lubricant is sprayed into the atmosphere. As a result, heat of vaporization is taken away from the lubricant when it is ejected into the second cooling chambers 30 from the thrust dynamic pressure bearing portions, and the temperature of the lubricant, which has become high in the thrust dynamic pressure bearing portions, can be lowered. Further, the temperature of the thrust plates 23 facing the second cooling chambers 30 and, by extension, the temperature of the spindle min shaft 2, can be lowered.

Further, in this spindle device, a labyrinth seal 31 is provided between the axial end of the spindle main shaft 2 equipped with the quill portion 5 and the bearing housing 1, whereby it is possible to prevent machine oil, coolant liquid, etc. pouring onto the spindle device from entering the bearing housing 1. This labyrinth seal 31 is opposed to the peripheral surface of the spindle main shaft 2 through the intermediation of a gap of several tens of μm, and held in a non-contact state with respect to the spindle main shaft 2, preventing intrusion of dust, liquid, etc. The peripheral surface of the spindle main shaft 2 opposed to the labyrinth seal 31 is made water-repellent, thus making the spindle main shaft less wettable with respect to coolant liquid or the like poured thereon. Thus, even if droplets of coolant liquid or the like are allowed to enter the gap between the labyrinth seal and the spindle main shaft, advancement of the droplets due to capillary action is restrained, with the result that intrusion of coolant droplets or the like into the housing is effectively prevented.

Further, a labyrinth seal is also provided between the motor housing 3 and the thrust plate 23, and the outer peripheral surface of the thrust plate 23 opposed to the labyrinth seal is made water-repellent, whereby the lubricant discharged from the thrust dynamic pressure bearing portion SB into the second cooling chamber 30 is prevented from leaking into the motor housing 3.

That is, in the spindle device of this embodiment, the entire outer peripheral surface of the spindle rotor, formed by the spindle main shaft 2, the sleeve 21, and the thrust plates 23, is made water-repellent except the portions where the dynamic pressure generating grooves are formed.

And, according to the spindle device of this embodiment, constructed as described above, the pair of radial dynamic pressure bearing portions RB is formed at a predetermined axial interval through the intermediation of the first cooling chamber 24, so that, even if a large radial load is applied to the quill portion 5 at the forward end of the spindle main shaft 2, and, as a result, a large moment load is applied to the spindle main shaft 2, it is possible to impart to the spindle main shaft 2 a sufficient rigidity that enables the shaft to withstand that moment load. Further, since the first cooling chamber 24 is provided between the pair of radial dynamic pressure bearing portions RB, it is possible to reduce the shearing force acting on the rotation of the spindle main shaft 2, and it is possible to reduce the rotational resistance for the spindle main shaft 2 and to mitigate power loss of the motor 4 while imparting a sufficient rigidity to the spindle main shaft 2.

Further, in addition, lubricant pressurized in the bearing gaps of the radial dynamic pressure bearing portions RB is systematically ejected into the first cooling chamber 24, and the vaporization of the lubricant is promoted in the process, so that it is possible to cool the lubricant and the spindle main shaft 2 through the heat of vaporization. Thus, it is possible to restrain thermal expansion of the spindle main shaft 2 due to the shearing frictional heat during high speed rotation and to improve the positional accuracy of the tool attached to the quill portion 5, with the result that it is possible to enhance the work machining precision in the machining conducted by using the spindle device.

Further, by rendering the outer peripheral surface of the spindle rotor water-repellent, it is possible to prevent the lubricant discharged from the dynamic pressure bearing portion, coolant liquid or the like pouring thereon outside the bearing housing from rotating together with the spindle main shaft, which also helps to reduce the power loss of the motor.

As described above, according to the spindle device of the present invention, a pair of radial dynamic pressure bearing portions is arranged through the intermediation of a first cooling chamber, and the rotation of the spindle rotor is supported by these radial dynamic pressure bearing portions, so that it is possible to obtain a sufficient rigidity with respect to the bending moment applied to the spindle rotor. Further, no great shearing force is applied to the spindle rotor, whereby it is possible to reduce heat generation and power loss in the spindle rotor.

Further, by ejecting the lubricant pressurized in each radial dynamic pressure bearing portion into the first cooling chamber, it is possible to positively cool the spindle rotor surrounded by this first cooling chamber and to cool the lubricant itself, whereby it is possible to restrain thermal expansion of the spindle main shaft.

What is claimed is:

1. A spindle device comprising: a housing; a spindle rotor one end portion of which protrudes from the housing; a pair of radial dynamic pressure bearing portions provided on the spindle rotor at a predetermined axial interval and rotatably supporting the spindle rotor with respect to the housing; a supply flow passage for guiding lubricant to bearing gaps of the radial dynamic pressure bearing portions; a first cooling chamber provided between the pair of radial dynamic pressure bearing portions so as to circumferentially surround the spindle rotor and communicating with the bearing gaps of the radial dynamic bearing portions; and an air inlet adapted to introduce atmosphere outside the housing into the first cooling chamber.

2. A spindle device according to claim 1, wherein the peripheral surface of the spindle rotor facing the first cooling chamber is rendered water-repellent.

3. A spindle device according to claim 1, further comprising a pair of thrust dynamic pressure bearing portions provided so as to axially sandwich from outside the pair of radial dynamic pressure bearing portions to restrict the spindle motor in its axial movement and to establish communication between bearing gaps of the thrust dynamic pressure bearing portions and the bearing gaps of the radial dynamic pressure bearing portions adjacent thereto, wherein each radial dynamic pressure bearing portion is equipped with dynamic pressure generating grooves for pressurizing lubricant supplied to the bearing gap thereof toward the bearing gap of the thrust dynamic pressure bearing portion adjacent thereto and pressurization discharge grooves for pressurizing the lubricant toward the cooling chamber.

4. A spindle device according to any one of claims 1 to 3, wherein there is provided between the spindle rotor and the housing a labyrinth seal portion for sealing the housing from the exterior thereof, the labyrinth seal portion being rendered water-repellent.

* * * * *